Patented Nov. 22, 1927.

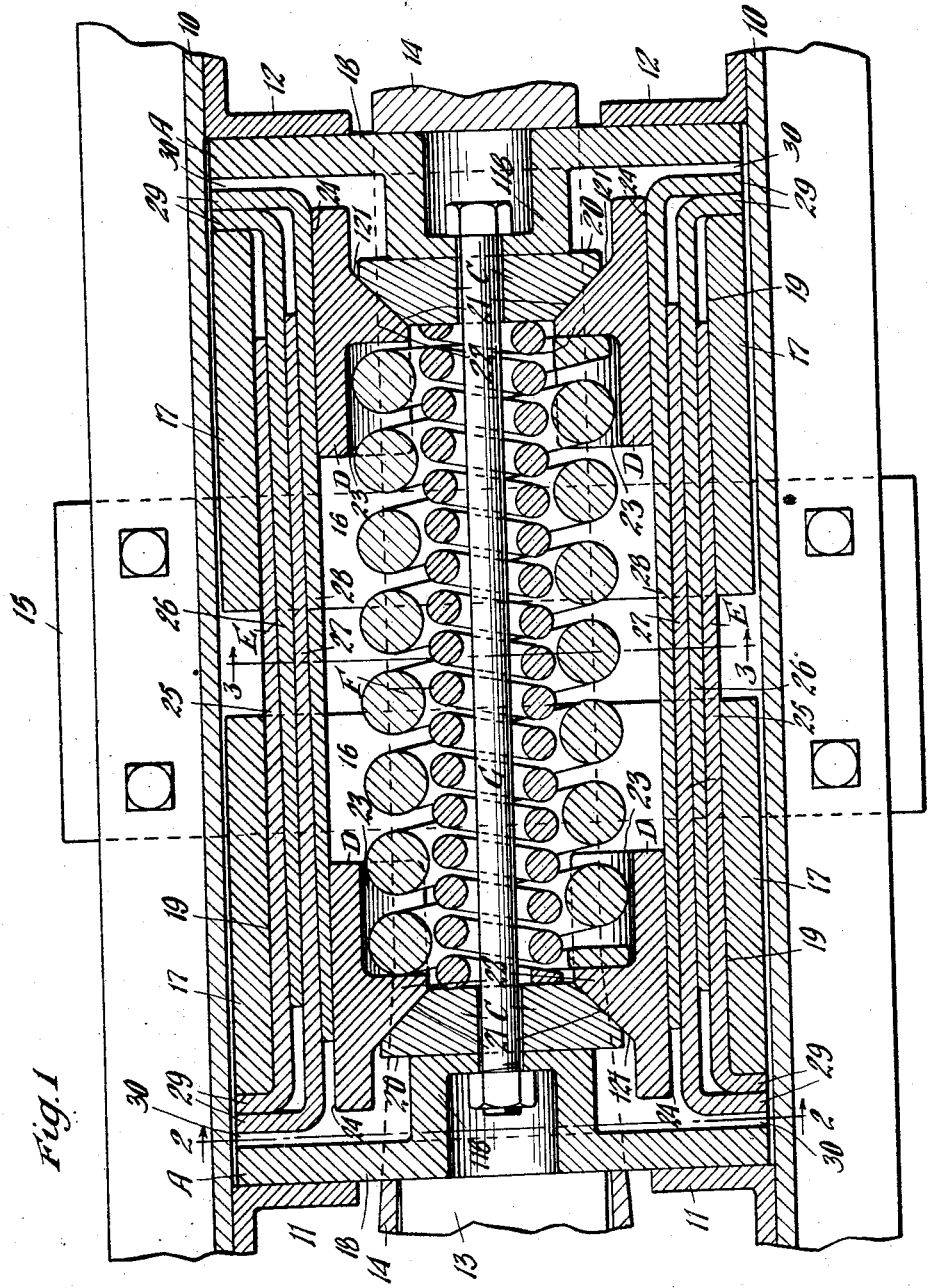

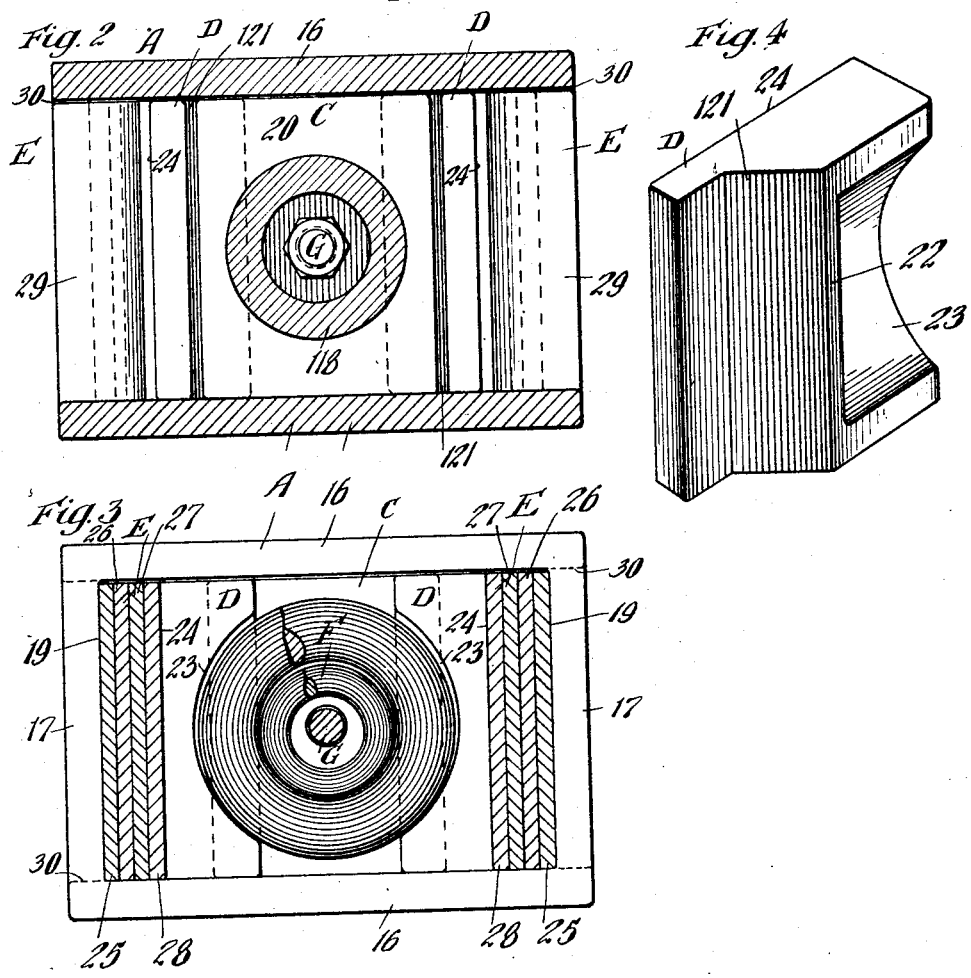

1,650,380

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 11, 1924, Serial No. 725,330. Renewed June 8, 1927.

This invention relates to improvements in friction shock absorbing mechanisms.

One object of the invention is to provide a friction shock absorbing mechanism of the intercalated plate type, more particularly adapted for railway draft riggings, wherein is obtained high capacity due to large frictional areas, together with certain release, the parts being so designed that the opposition between the plates and main followers to lateral displacement of the parts, will be reduced to a minimum.

A more specific object of the invention is to provide a mechanism of the character indicated, comprising a plurality of intercalated tapered, friction plates, wherein the ends of the plates coacting with the followers are provided with means for preventing binding of the plates on the followers, and for preventing injury to the inner faces of the followers, by the coacting ends of the plates.

In the drawings forming a part of this specification, Figure 1 is a horizontal, longitudinal, sectional view of a railway draft rigging, showing my improvement in connection therewith. Figures 2 and 3 are vertical, transverse, sectional views corresponding respectively to the lines 2—2 and 3—3 of Figure 1. And Figure 4 is a detailed, perspective view of one of the wedge members used in connection with my improved mechanism.

In said drawings, 10—10 indicate channel-shaped center or draft sills of a railway car underframe, to the inner faces of which are secured front stop lugs 11—11 and rear stop lugs 12—12. A portion of the drawbar is indicated at 13 to which is attached a hooded yoke 14. The shock absorbing mechanism proper, including the front and rear follower casings, is disposed within the yoke 14 and the whole are supported by a detachable saddle plate 15.

The improved shock absorbing mechanism, as shown, comprises broadly front and rear follower casings A—A; front and rear wedge blocks C—C; front and rear pairs of wedge shoes D—D; two groups of friction plates E—E; a spring resistance F; and a retainer bolt G.

The friction casings or housings A are of like construction, each being of rectangular cross-section and open at the inner end. Each of the casings has spaced, longitudinally disposed, top and bottom walls 16—16; spaced, longitudinally disposed side walls 17—17 and a transverse end wall 18, adapted to coact with the corresponding stop lugs in the manner of a follower. The end wall 18 of each casing A is provided with a central, vertically disposed hollow extension 118 inwardly extending therefrom and adapted to form an abutment for the corresponding wedge block C. As clearly shown in Figure 1, a space is left between the end wall 18 and the corresponding ends of the side walls 17 of each casing, thereby providing an opening 30 for a purpose hereinafter described. The inner sides of the walls 17 present longitudinally disposed friction surfaces 19 with which the groups of friction plates E are adapted to cooperate.

The front and rear wedge blocks C are of like construction, each block being of a height approximating the distance between the top and bottom walls of the casings A, and having a flat outer face 20 adapted to cooperate with the end face of the corresponding projection 118. Each block is also provided with a pair of faces 21 disposed on opposite sides thereof and converging inwardly of the mechanism and adapted to coact with the adjacent pair of friction wedge shoes D.

The friction wedge shoes D are four in number, arranged in pairs at opposite ends of the mechanism, each pair coacting with the corresponding wedge block C. The shoes D are all of like design, and each shoe is provided on the inner side thereof, that is the side nearest, and adjacent to the axis of the mechanism, with a lateral enlargement 22 having an outer wedge face 121 correspondingly inclined to and adapted to coact with the wedge face 21 at the corresponding side of the adjacent wedge member C. Rearwardly of the enlargement 22 each wedge shoe D is provided with a concave recess 23 adapted to accommodate, and provide clearance for the corresponding side of the main spring resistance F. On the outer side, each shoe is provided with a longitudinally disposed, flat friction surface 24 adapted to cooperate with the innermost plate of the corresponding group E.

The friction plates E are arranged within the casings A and comprise two oppositely disposed groups. As herein shown, each group comprises four plates, 25, 26, 27 and 28. The plates E are all of substantially the same design, each plate being tapered longitudinally and having the thick end thereof bent at right angles to the main body portion of the plate as indicated at 29. The adjacent plates E of each group are reversely arranged, end for end, as clearly shown in Figure 1, the outermost plate 25 of each group having the angularly disposed end 29 at the front end of the mechanism and extending laterally outwardly in overhanging relation to the corresponding side wall 17 of the front casing A. The plate 26 of each group has the angular portion 29 thereof at the rear end of the mechanism overhanging the end of the side wall 17 of the rear follower casing A at the corresponding side of the gear. The plate 28 of each group has the angular portion disposed at the rear end of the mechanism also, extending in the same direction as and in overhanging relation to the extension 29 of the plate 26, and the plate 27 has the extension 29 disposed at the front end of the mechanism in overhanging relation to the extension 29 of the plate 25. In this connection, it will be noted that the extensions 29 of the various plates work in the openings 30, the extensions 29 being of different length so that their outer ends are in the same longitudinal plane, or in other words, are flush with the outer surface of the corresponding side walls 17 of the casings A. The plates are thus anchored to the respective casings A for outward movement thereof, and due to the abutting relation of the portions 29 thereof adjacent plates are movable outwardly relatively to each other, with the respective front and rear casings.

The main spring resistance F comprises an inner, relatively light coil and an outer relatively heavier coil, the inner coil having its front and rear ends bearing directly on the front and rear wedges C and the outer coil having its front and rear ends bearing respectively on the enlargements 22 of the front and rear pairs of shoes D.

The shock absorbing mechanism is held under initial compression by the retainer bolt G anchored to the projections 118 of the front and rear followers A respectively, extending through the inner coils of the spring resistance F and aligned openings in the front and rear wedge members C. In the normal position of the parts, the outer faces of the angular projections 29 of the plates 27 and 28 are spaced slightly from the corresponding end walls 18 of the casings A respectively, and the inner ends of the casings A are spaced apart a predetermined distance corresponding to the compression stroke of the mechanism.

In the operation of my improved shock absorbing mechanism, assuming an inward or buffing movement of the draw-bar, the front casing will be moved therewith, forcing the wedge C and the shoes D inwardly, compressing the main spring resistance F, thereby forcing the rear pair of shoes D against the rear wedge C. At the same time, a wedging action will be set up between the front and rear wedges and the shoes D, placing the friction plates under lateral pressure. As the rearward movement of the front casing continues, the front pair of shoes D will slip on the innermost friction plates of the two groups and said plates will slip on the rear pair of friction shoes, the two groups of plates being carried rearwardly bodily, due to the friction existing between the casings, plates and the front shoes D. The end walls 18 of the front and rear follower casings A will thus gradually approach the corresponding ends of the plates. This action will continue until the wall 18 of the front casing engages with the front ends of the plates 27, and the wall 18 of the rear casing is engaged by the rear ends of the plates 28, whereupon the plates will be moved relatively to each other, the plates 25 and 26 being moved directly by engagement of the portions 29 with the corresponding portions of the plates 27 and 28 respectively. Due to the taper of the plates E, a differential action will be set up, causing the shoes of the front and rear pairs to approach each other slipping on the wedge faces 21 of the wedge blocks C, thereby effecting a more rapid approach of the front and rear pairs of shoes and producing an additional compression of the outer coil of the main spring resistance F. It will be evident that during the realtive movement of the friction plates, last described, the friction resistance will be greatly increased. The described action of the mechanism will continue until the inner ends of the casings A come into abutment, whereupon the actuating force will be transmitted directly through the casings to the stop lugs, thereby preventing the spring resistance element F from being driven solid.

As will be evident, there will be a considerable amount of relative lateral movement between the various plates and between the plates and the end walls 18 of the front and rear casings during the compression stroke of the mechanism, due to the taper of the various plates. The portions 29 of the plates will slide on each other, and on the corresponding end wall 18 of the casing A. The casings and plates are thus provided with relatively large coacting flat engaging faces, thereby preventing injury to the end walls of the casings through gouging, which is common in gears of this type, when the comparatively narrow end edges of the plates bear directly on the walls. By providing the plates with bent ends which bear on the end walls of the casings, comparatively free lateral movement of the plates with reference to the end walls of the casings is had, there being no tendency of the ends of the plates to dig into the said walls.

Upon removal of the actuating force, the wedge pressure will be relieved, the wedge member C being forced outwardly initially due to the direct engagement thereof by the inner coil of the main spring resistance F, due to the spacing of the bent ends 29 of the plates with reference to the outer ends of the side walls 17 of the casings A. During the compression stroke, the outer coil of the main spring resistance will also force the wedge shoes D outwardly before any relative movement of the friction plates takes place. As the wedge members C are forced outwardly, the casings A will be carried therewith, bringing the outer ends of the walls 18 into engagement with the lateral extensions 29 of the plates, carrying alternate plates outwardly therewith and restoring the same to normal position.

I have herein shown and described what I now consider to be the preferred manner of carrying out my invention, but the same is merely illustrative and I contemplate all changes and modifications that come within the scope of the claims appended hereto.

I claim:

1. In a friction shock absorbing mechanism, the combination with front and rear follower acting casing members having interior, longitudinally disposed friction surfaces; of a main spring resistance; a plurality of relatively movable, longitudinally disposed, intercalated, friction plates within said casings; means for placing said plates under lateral pressure, said plates and casings having co-operating, flat, transversely elongated, pressure transmitting surfaces.

2. In a friction shock absorbing mechanism, the combination with front and rear relatively movable follower acting means; of a plurality of relatively movable, laterally displacable, intercalated friction plates interposed between said means, said plates being moved relatively longitudinally of the mechanism upon relative movement of said follower means, alternate plates having inter-engaging flat transversely elongated pressure transmitting surfaces at one end thereof for receiving the actuating pressure from one of said follower means; means for compressing said plates laterally; and a main spring resistance.

3. In a friction shock absorbing mechanism, the combination with front and rear follower acting casings, relatively movable toward and from each other, said casings having interior, longitudinally disposed friction surfaces; of a plurality of relatively movable, longitudinally disposed, intercalated friction plates within said casings cooperating with the friction surfaces thereof, said plates being divided into two groups at opposite sides of the mechanism, each of said plates having one end thereof laterally extended, alternate plates of each group having the laterally extended portions inter-engaging; abutment means on said casings adapted to co-operate with said lateral extensions for restoring the plates to normal position; a main spring resistance; and lateral pressure creating means interposed between said groups of plates and co-operating with said front and rear follower acting casings.

4. In a friction shock absorbing mechanism, the combination with front and rear follower acting casings, relatively movable toward and from each other, each of said casings having longitudinally disposed side walls and a transverse end wall, said side walls presenting interior friction surfaces; of a plurality of intercalated, relatively movable longitudinally disposed friction plates co-operating with the friction surfaces of said casings, said plates being divided into two groups disposed at opposite sides of the mechanism, each of said plates having one end thereof laterally extended, the extended portions of alternate plates of said groups being adapted to co-operate with the end walls of said casings to receive the actuating force; a main spring resistance; and spreading means interposed between said two groups of plates for placing the same under lateral pressure.

5. In a friction shock absorbing mechanism, the combination with front and rear follower casings each having longitudinally disposed side walls and a transverse end wall, said side walls presenting longitudinally disposed interior friction surfaces and having their outer ends spaced from the corresponding end wall; of a plurality of relatively movable, longitudinally disposed, intercalated friction plates within said casings and co-operating with the friction surfaces thereof, said plates being divided into two groups disposed at opposite sides of the mechanism, each of said plates having one end thereof laterally extended, alternate plates of each group having the extended ends thereof co-operating respectively with the outer ends of the side walls and the end wall of one of said casings; a main spring resistance; a lateral wedge pressure transmitting means interposed between said groups of plates and co-operating with said front and rear follower casings.

6. In a friction shock absorbing mechanism, the combination with a plurality of tapered, relatively movable, intercalated friction plates, each of said plates having one end thereof laterally extended to provide a flat transverse bearing surface; of front and rear relatively movable follower members, one of said members being adapted to co-operate with the flat end bearing surfaces of certain of said plates, and the remaining follower being adapted to co-operate with the flat end bearing surfaces of the remaining plates, each of said followers being provided with longitudinally disposed friction surfaces adapted to co-operate with said plates; a lateral wedge pressure creating means coacting with said plates and adapted to be actuated upon relative movement of said followers; and a main spring resistance cooperating with said lateral wedge pressure creating means.

In witness that I claim the foregoing I have hereunto subscribed my name this 8th day of July, 1924.

JOHN F. O'CONNOR.